United States Patent Office 3,473,633
Patented Oct. 21, 1969

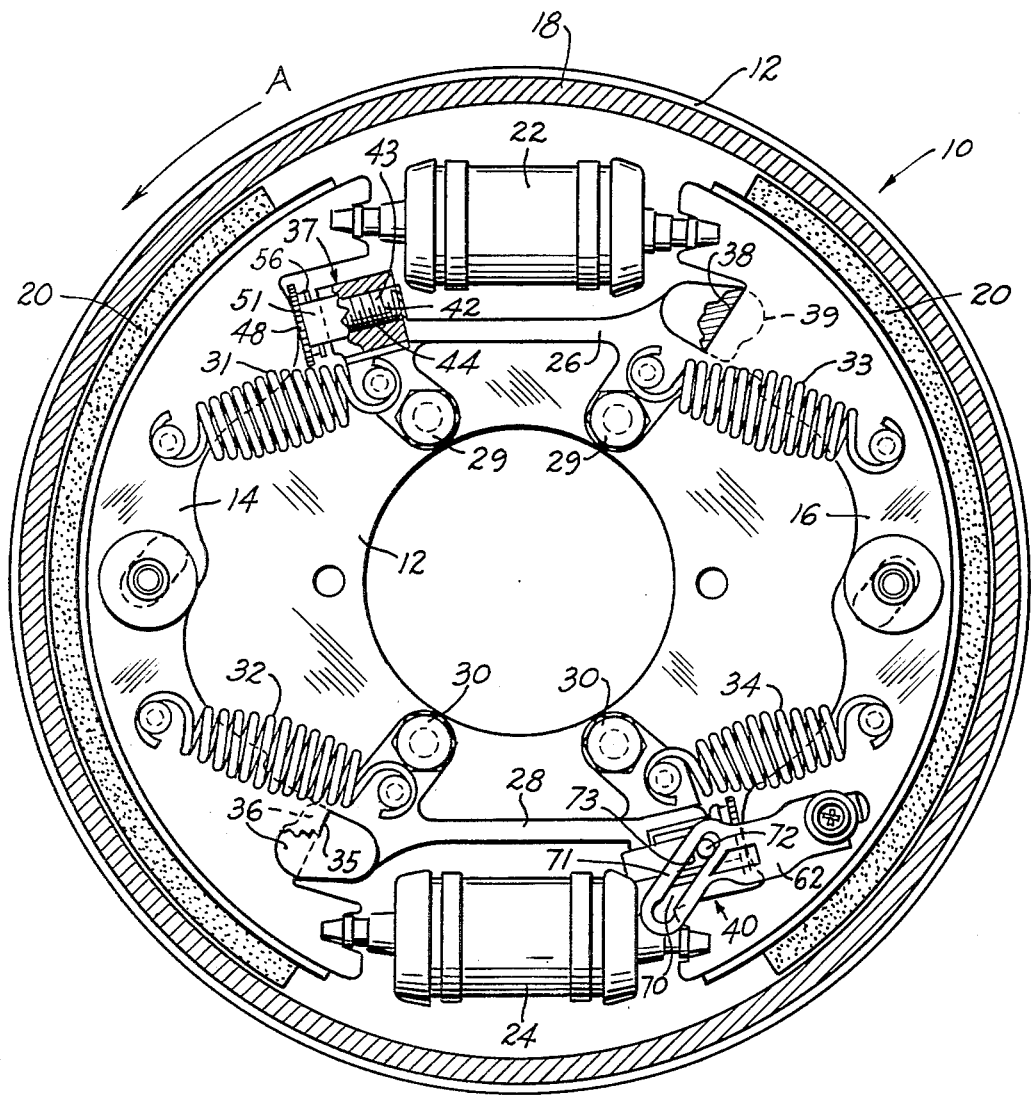

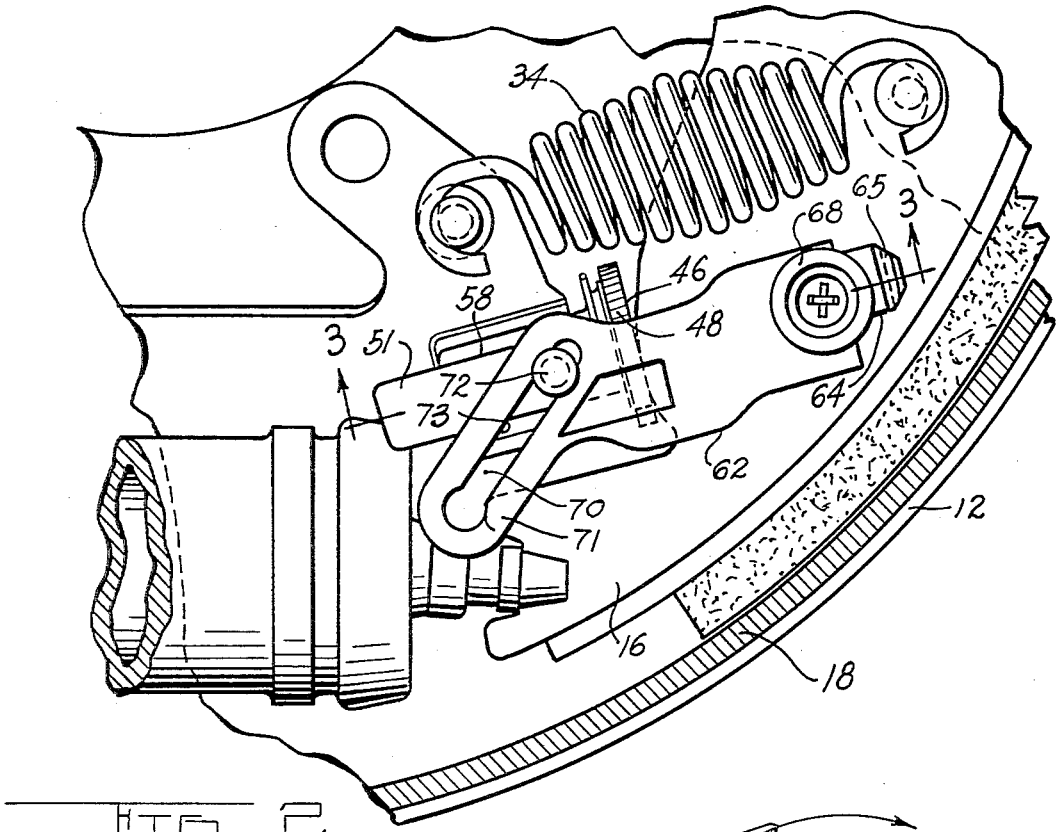
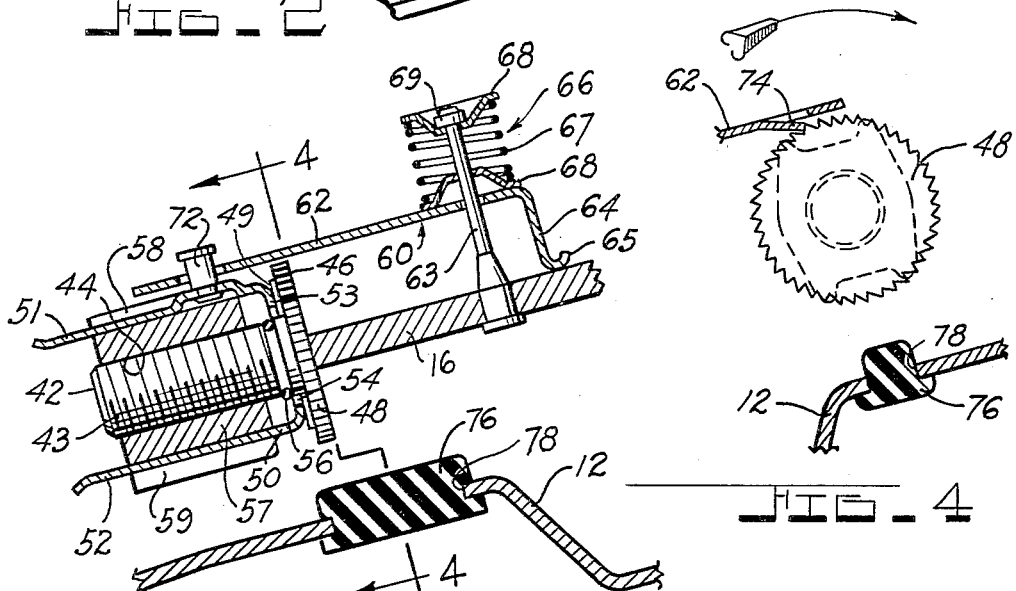
INVENTOR.
SIDNEY E. HAGERTY.
ATTORNEY.

3,473,633
ADJUSTER FOR DRUM BRAKES
Sidney E. Hagerty, Union, Mich., assignor to The Bendix Corporation, a corporation of Delaware
Filed June 28, 1967, Ser. No. 649,510
Int. Cl. F16d 65/58
U.S. Cl. 188—79.5                                                8 Claims

ABSTRACT OF THE DISCLOSURE

A brake shoe adjuster comprising an axially positionable member mounted to a fixed part of the brake for engagement with an end of a brake shoe for repositioning said shoe with respect to its associated drum as the lining of the shoe wears, and a lever pivotally connected to said shoe with one end of said lever operatively connected to said member to vary its axial position in response to brake shoe movement.

SUMMARY

It is an object of this invention to provide an adjuster for a drum brake which utilizes a minimum of parts.

Another object of the invention is to provide a brake shoe adjuster for drum brakes which requires a minimum of maintenance and may be operated automatically or manually.

A still further object of the invention is to provide an adjuster for drum brakes comprising a lever actuator operatively connected between a brake shoe and a star wheel stud threadedly mounted to a fixed anchor bracket of the brake for positioning said shoe with respect to its associated drum as the lining wears a predetermined amount.

An important object of the invention is to provide a brake shoe adjuster for a drum brake which performs the adjusting function when there is no braking torque being applied to the adjuster by the brake shoe.

Another important object of the invention is to provide a brake shoe adjuster for drum brakes which is insensitive to shoe position.

A more complete understanding of the invention may be had from the following detailed description with reference to the accompanying drawings.

FIGURE 1 is a front elevational view of a brake assembly with which the invention is associated;

FIGURE 2 is an enlarged fragmentary view of the lower portion of the brake assembly showing the adjuster;

FIGURE 3 is a view in section taken on the line 3—3 of FIGURE 1; and

FIGURE 4 is a view taken on the line 4—4 of FIGURE 3.

DETAILED DESCRIPTION

Referring now to the drawings, a brake assembly 10 is provided with a backing plate 12, and two opposed, radially displaceable brake shoes 14 and 16 which are slidably arranged on said backing plate for engagement with a rotatable brake drum 18. Each of the brake shoes 14 and 16 is equipped with a friction lining 20. Wheel cylinders 22 and 24 are fastened to the backing plate 12 by means, not shown. These wheel cylinders 22, 24, sometimes called fluid motors, are located between the adjacent ends of the brake shoes 14, 16 in a manner to operatively connect the wheel cylinders to the shoe ends to thrust the ends outwardly upon energization of the fluid motors in a manner well known in the art. The braking torque from the brake shoes 14, 16 is taken in fixed members 26 and 28 which are securely attached to the backing plate 12 by bolts 29 and 30, respectively. The bolts 29 and 30 first pass through their respective fixed members or anchoring members, thence through the backing plate 12 and finally through a fixed part of the vehicle, generally an axle flange or the like, not shown.

Springs 31 and 32 connect the shoe 14 to the fixed members 26 and 28, respectively, for retaining the shoe in its retracted position out of contact with the brake drum 18. Likewise, springs 33 and 34 retain the shoe 16 against the fixed members 26 and 28, respectively, out of contact with the brake drum 18. The shoe 14 is formed at its lower end so as to ride on an anchoring surface 35 formed in the fixed member 28. The anchoring surface 35 is formed in the fixed member 28 between two flanges 36, which hold the shoe end against lateral displacement. The upper end of shoe 14 is carried on the fixed member 26 through an adjustable assembly 37, to be hereinafter described in detail. The springs 31, 32 retract the shoe 14 into anchoring relationship to the fixed members 26 and 28.

The shoe 16 anchors at its upper end on anchoring surface 38 formed on the fixed member 26 between parallel flanges 39, one of which is broken away in FIGURE 1, which retain the upper end of the shoe in a fixed lateral position in the brake assembly. The lower end of shoe 16 anchors on the fixed member 28 through an adjustable assembly 40. The springs 33, 34 hold the shoe 16 in anchoring relationship to the fixed members or torque-taking members 26 and 28.

As observed in FIGURE 1, the arrangement of the brake is symmetrical in the sense that movement of the brake shoes and their applying and anchoring means is identical. Therefore, a description of the operation of one half of the brake including one shoe serves as an adequate description of the operation of the other half of the brake. As above stated, each of the shoes 14 and 16 is provided with an automatic adjustable assembly. Each of the automatic adjustable assemblies 37 and 40 comprises an element 42 having threads 43 to be received by a threaded bore 44 formed in the respective fixed members, at locations circumferentially disposed from their respective anchoring surfaces 38 and 35. With specific reference to FIGURE 3, it will be observed that the extendible element 42 is formed at its outer end with an enlarged head 46, serrated at its periphery to provide a star wheel 48. A member 50 having opposed sides 51, 52 and an interconnecting end portion 53 is provided with an aperture 54 therein which receives the extendible element 42 which passes therethrough. The member 50, which is in the form of a spring clip, has its end portion 53 held against the inner end 49 of the star wheel by a snap ring 56 which engages a groove 57 formed in the extendible member adjacent the star wheel but spaced therefrom a distance sufficient to allow the end portion 53 to be inserted therebetween. The sides 51 and 52 slidably engage and ride in grooves 58 and 59 located in that portion of the fixed member in which the threaded bore 44 is formed. The adjustable assembly further comprises actuator means 60 interconnected between the member 50 and the brake shoe. The actuator means 60 comprises a lever 62 pivotally carried on the shoe 16 at one end by a pin 63 which passes through the shoe web at the right angles thereto to pivotally receive the lever 62. The end of the lever adjacent pin 63 is bent downwardly at 64 for support by the shoe web. The end of that portion of 64 which is in engagement with the shoe web is turned upwardly at 65 to form a substantial bearing surface which prevents the end from digging into the web as the lever pivots about pin 63. The lever 62 is held in pivotal relationship to the brake shoe by a spring assembly 66 comprising a spring 67 and retainers 68 located between the lever 62 and head 69 of the pin 63. That end of said lever 62 opposite its pivot point is provided with an angularly disposed slot 70 formed in end 71 of the lever. A connecting member or cam follower 72 is fixed to one leg of the spring clip 50 and extends through the slot 70 for engagement with cam surface 73. The lever 62 drivably engages the star wheel 48 through a projection or pawl 74 formed in the lever, as best shown in FIGURE 4. With specific reference to FIGURES 3 and 4, it will be noted that manual adjustment of the star wheel 48 may be made by removing a plug or closure member 76 which is fitted into an opening 78 of the backing plate 12.

OPERATION

Assuming rotation of the drum 18 in the direction of Arrow A, upon application of hydraulic pressure to the fluid motors or wheel cylinders 22 and 24, the brake shoes 14 and 16 will be spread outwardly into engagement with the drum 18. The shoe 16 anchors at its upper end on the anchoring surface 38 of the fixed member 26, and the shoe 14 anchors at its lower end on the anchoring surface 35 of the fixed member 28.

Considering now specifically operation of the adjuster assembly 40, as the shoe 16 moves away from engagement with the star wheel end of the expendible element 42 the lever 62 rotates about the pin 63 in a clockwise direction due to the camming action between the camming surface 73 and cam follower 72, thus causing the pawl 74 to engage a tooth of the star wheel to rotate the extendible member 42 if movement of the brake shoe is sufficient due to lining wear. It will be noted that the teeth on the star wheel are spaced thereon in such a manner that if an adjustment takes place due to shoe movement a given distance away from the extendible member, the adjustment is limited to a predetermined amount irrespective of the distance the shoe end travels from its contact relationship with the extendible member 42, thus preventing overadjustment. In other words, even though the lever 62 is pivotally connected to and follows the shoe 16, notwithstanding drum distortion due to high temperature, the amount of adjustment of the extendible member is a predetermined amount, such that overadjustment would not occur under normal conditions of operation. The amount of adjustment made during a brake application is determined by the size or number of teeth on the star wheel and the angle of the camming surface 73 of the slot 70 with respect to the axis of the extendible element 42. Upon release of the brake, the shoe return spring 34 will return the shoe 16 to its released or retracted position so that the lower end of shoe 16 is now in engagement with the star wheel end 48 of the extendible member 42. During the return action of the shoe 16 of the pawl 74 of the lever 62, which is now rotating counterclockwise, rides back over the teeth of the star wheel to its normal retracted position. Rotation of the star wheel in the reverse direction, which might otherwise be caused by the pawl 74 riding in a reverse direction (counterclockwise) over the teeth as aforementioned, is prevented by the snap ring 56 which contacts the inner end portion 53 of the U-shaped member 50 so as to create a frictional interference fit between the star wheel and said end portion 53. This arrangement of parts restrains the star wheel from backing up as the pawl moves back over the teeth in a direction to the left as viewed in FIGURE 4 to take up another notch. Accordingly, a brake adjustment will be made on brake application if the lining is sufficient worn to allow rotation of the star wheel 48. It is to be observed that a brake adjustment is made, i.e., the star wheel 48 is rotated, at a time when the lower end of shoe 16 is out of contact with the head 46, thus performing an adjustment at a time when no load is on the star wheel 48. This allows an unobstructed adjustment and minimizes damage to the adjuster.

Operation of the adjuster assembly has been described in detail in connection with adjuster assembly 40 but it is to be understood that the operation and action of adjuster assembly 37 in connection with its associated shoe 14 is identical to that of adjuster assembly 40 and its associated shoe 16.

The adjuster assembly has been described in a situation where adjustment of the shoe is done during a brake application but it is to be noted that by modifying the adjuster assembly it could be made to adjust upon brake release as well. This is accomplished by changing the location of the pawl on the lever, the direction of the teeth on the star wheel, and the hand of the screw thread on the extendible member 42. If brake shoe adjustment is performed upon release of the brakes as aforementioned, shoe return spring 34 would cause rotation of the star wheel through the action of the lever and pawl, as the shoe is returned to its retracted position.

Although only one embodiment of the invention has been described in detail, numerous modifications of the invention will occur to those skilled in the art.

I claim:

1. In a brake, a rotatable drum, a brake shoe, a fixed member, an adjustable assembly mounted on said fixed member to be engaged by said shoe at one end thereof in its retracted position and operatively connected to said shoe, means for moving said one end of said shoe out of engagement with said adjustable assembly and into engagement with said drum, means for moving said shoe end into engagement with said adjustable assembly, said adjustable assembly comprising an extendible element having one end adjustably secured to said fixed member and its other end engageable by said shoe at its one end, a member slidable on said fixed member and connected to said extendible element for movement therewith, and actuator means pivotally mounted on said shoe and drivably connected to said element to extend said element in response to movement of said one end of said shoe, there being a cam and follower connection between said actuator means and said slidable member.

2. The structure as recited in claim 1 wherein said extendible element threadedly engages said fixed member for rotation thereon by said actuator to extend said element to reposition said shoe.

3. The structure as recited in claim 1 wherein said actuator means includes a lever pivotally carried on said one end of said shoe and the other end of said lever being formed wth a camming surface which is operatively connected to said slidable member to impart rotation to said lever, and means interconnecting said lever to said extendible element to establish said element in a new position upon rotation of said lever.

4. The structure as recited in claim 1 wherein said extendible element is formed with a threaded body for threadedly engaging said fixed member and a star wheel integral therewith for engagement with said actuator, and said actuator means includes a lever pivotally carried at one of its ends on said one end of said shoe and the other end of said lever being provided with a camming surface which is operatively connected to said slidable member to impart rotation to said lever, said other end of said lever including a projection which engages said star wheel to rotate the same.

5. The structure as recited in claim 4 wherein said camming surface is formed in a slot in said other end of said lever at an angle with respect to the axis of said threaded body to cause rotation of said lever upon movement of said one end of said shoe.

6. The structure as recited in claim 1 wherein said actuator means includes a lever pivotally carried on said one end of said shoe and the other end of said lever being formed with a camming surface, said slidable member being a spring clip having opposed sides and a closed end, said end rotatably receiving said extendible element so as to follow it, said sides slidably secured to said fixed member, and a connecting member carried by one of said opposed sides for engagement with said camming surface.

7. In a brake, a rotatable drum, a brake shoe, a fixed member having a threaded bore, means operatively connected to one end of said shoe for moving said shoe into engagement with said drum and out of engagement therewith, an adjustable assembly mounted on said fixed member and connected to said brake shoe, said adjustable assembly comprising an extendible element threadedly engaging said threaded bore, a slidable member carried by said extendible element and slidably attached to said fixed member, a lever pivotally secured to said one end of said shoe, said lever having a cam thereon connected to said slidable member, to thereby impart rotation to said lever in response to movement of said one end of said shoe, and a pawl on said lever in driving engagement with said extendible element to induce rotation thereof in said threaded bore.

8. The structure as recited in claim 7, wherein said fixed member is formed with two slots, one on each side of said bore and extending axially therealong, and said slidable member is a spring clip having two opposed sides which ride in said slots.

References Cited

UNITED STATES PATENTS 2,570,398    10/1951    Smith.
3,334,710    8/1967    Thompson et al.

DUANE A. REGER, Primary Examiner

U.S. Cl. X.R.

188—196